US010462294B2

(12) United States Patent
Khan et al.

(10) Patent No.: US 10,462,294 B2
(45) Date of Patent: *Oct. 29, 2019

(54) METHOD AND APPARATUS FOR PROCESSING A COMMUNICATION REQUEST FROM A ROAMING VOICE OVER IP TERMINAL

(71) Applicant: AT&T Intellectual Property I, L.P., Atlanta, GA (US)

(72) Inventors: Arshad Khan, Austin, TX (US); William R. J. Chorley, Spicewood, TX (US); Chaoxin Charles Qiu, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,261

(22) Filed: Dec. 30, 2015

(65) Prior Publication Data
US 2016/0113042 A1    Apr. 21, 2016

Related U.S. Application Data

(63) Continuation of application No. 11/423,877, filed on Jun. 13, 2006, now Pat. No. 9,252,981.

(51) Int. Cl.
*H04M 3/51*    (2006.01)
*H04W 88/16*    (2009.01)
(Continued)

(52) U.S. Cl.
CPC .......... *H04M 3/5116* (2013.01); *H04L 12/66* (2013.01); *H04M 7/0069* (2013.01); *H04W 4/02* (2013.01);
(Continued)

(58) Field of Classification Search
CPC ......... H04W 4/02; H04W 64/00; H04W 4/22; H04W 76/007; H04W 88/06;
(Continued)

(56) References Cited

U.S. PATENT DOCUMENTS

6,940,950 B2    9/2005  Dickinson et al.
7,433,673 B1 *  10/2008  Everson ................. H04W 4/02
                                             455/404.1
(Continued)

*Primary Examiner* — Asad M Nawaz
*Assistant Examiner* — Najeeb Ansari (57) ABSTRACT

An apparatus and method are disclosed for processing a communication request from a roaming VoIP terminal. An apparatus that incorporates teachings of the present disclosure may include, for example, a network proxy having a controller that manages a communications interface in a communication system. The controller can be programmed to receive from a Voice over IP (VoIP) terminal a request to communicate with a destination point, wherein the request comprises an identification (ID) of the destination point, an ID of the VoIP terminal, and a media access control (MAC) address of a gateway providing the VoIP terminal communication access to the network proxy, and determine from the MAC address of the gateway and the ID of the VoIP terminal whether the VoIP terminal is roaming outside of a home network. Additional embodiments are disclosed.

18 Claims, 3 Drawing Sheets

(51) Int. Cl.
*H04W 64/00* (2009.01)
*H04W 4/02* (2018.01)
*H04L 12/66* (2006.01)
*H04M 7/00* (2006.01)
*H04W 76/50* (2018.01)

(52) U.S. Cl.
CPC ......... *H04W 64/00* (2013.01); *H04W 64/003* (2013.01); *H04W 76/50* (2018.02); *H04W 88/16* (2013.01); *H04M 2242/04* (2013.01)

(58) Field of Classification Search
CPC ..... H04W 84/12; H04W 88/08; H04W 76/50; H04M 2242/30; H04M 2242/04; H04M 3/42348; H04M 3/5116; H04M 11/04
See application file for complete search history.

(56) References Cited

U.S. PATENT DOCUMENTS

| | | | |
|---|---|---|---|
| 8,401,003 B1* | 3/2013 | Petit-Huguenin | H04L 12/66 370/352 |
| 2003/0211839 A1* | 11/2003 | Baum | H04L 29/12018 455/403 |
| 2003/0233580 A1 | 12/2003 | Keeler et al. | |
| 2004/0057425 A1 | 3/2004 | Brouwer et al. | |
| 2005/0063519 A1 | 3/2005 | James | |
| 2005/0090225 A1 | 4/2005 | Muehleisen et al. | |
| 2005/0135569 A1 | 6/2005 | Dickinson et al. | |
| 2005/0181805 A1* | 8/2005 | Gallagher | H04L 12/66 455/456.1 |
| 2005/0186948 A1* | 8/2005 | Gallagher | H04W 16/16 455/414.1 |
| 2005/0190892 A1 | 9/2005 | Dawson et al. | |
| 2005/0213716 A1 | 9/2005 | Zhu et al. | |
| 2006/0030290 A1 | 2/2006 | Rudolf et al. | |
| 2006/0039539 A1 | 2/2006 | Goldman et al. | |
| 2006/0120517 A1* | 6/2006 | Moon | H04M 11/04 379/45 |
| 2006/0234701 A1 | 10/2006 | Wang et al. | |
| 2006/0252408 A1* | 11/2006 | Faccin | H04W 4/02 455/404.2 |
| 2006/0268902 A1 | 11/2006 | Bonner | |
| 2007/0014282 A1 | 1/2007 | Mitchell | |
| 2007/0082470 A1 | 4/2007 | Fitzgerald et al. | |
| 2007/0121598 A1 | 5/2007 | McGary | |
| 2007/0184845 A1* | 8/2007 | Troncoso | H04W 64/00 455/456.1 |
| 2007/0233899 A1* | 10/2007 | Aborn | H04W 64/003 709/245 |
| 2007/0238448 A1 | 10/2007 | Gallagher et al. | |
| 2008/0194225 A1 | 8/2008 | Tischer et al. | |
| 2008/0293413 A1 | 11/2008 | Sharif-Ahmadi et al. | |
| 2009/0129371 A1 | 5/2009 | Bishay | |
| 2009/0196284 A1 | 8/2009 | Beinroth | |

* cited by examiner

METHOD AND APPARATUS FOR PROCESSING A COMMUNICATION REQUEST FROM A ROAMING VOICE OVER IP TERMINAL

This application is a continuation of U.S. patent application Ser. No. 11/423,877, filed Jun. 13, 2006, which is currently allowed and is herein incorporated by reference in its entirety.

RELATED APPLICATION

U.S. patent application Ser. No. 11/423,886, filed Jun. 13, 2006, by Gorti et al., entitled "Method and Apparatus for Processing Session Initiation Protocol Messages Associated with a Voice Over IP Terminal," incorporated herein by reference in its entirety.

FIELD OF THE DISCLOSURE

The present disclosure relates generally to Voice over IP (VoIP) communications, and more specifically to a method and apparatus for processing a communication request from a roaming VoIP terminal.

BACKGROUND

Multimode VoIP terminals can roam on a number of wired or wireless access technologies by way of a common gateway such as a residential gateway. Because of the nomadic nature of multimode VoIP terminals, it can be difficult to know when said terminals are roaming outside of a home network (e.g., a residence or commercial enterprise) since what is generally known about the terminal is its IP address which is not fixed to a single location. It is similarly a challenge to locate the VoIP terminal once it has roamed outside of its home network.

These complications can make call processing problematic for service providers especially in situations where the caller is attempting to communicate with an emergency response center such as a public service access point (PSAP) for 911 services which requires knowledge of the terminal's location to comply with Federal Communications Commission (FCC) regulations.

A need therefore arises for a method and apparatus for processing a communication request from a roaming VoIP terminal.

DETAILED DESCRIPTION OF THE DRAWINGS

Embodiments in accordance with the present disclosure provide a method and apparatus for processing a communication request from a roaming VoIP terminal.

In a first embodiment of the present disclosure, a network proxy can have a controller that manages a communications interface in a communication system. The controller can be programmed to receive from a Voice over IP (VoIP) terminal a request to communicate with a destination point, wherein the request comprises an identification (ID) of the destination point, an ID of the VoIP terminal, and a media access control (MAC) address of a gateway providing the VoIP terminal communication access to the network proxy, and determine from the MAC address of the gateway and the ID of the VoIP terminal whether the VoIP terminal is roaming outside of a home network.

In a second embodiment of the present disclosure, a computer-readable storage medium in a VoIP terminal can have computer instructions for requesting from a gateway its media access control (MAC) address, and transmitting to a network proxy a request to communicate with a destination point, wherein the request comprises the MAC address of the gateway.

In a third embodiment of the present disclosure, a gateway can have a controller programmed to transmit the gateway's MAC address to a VoIP terminal, and transmitting to a network proxy a request received from the VoIP terminal to communicate with a destination point, wherein the request comprises the MAC address of the gateway.

In a fourth embodiment of the present disclosure, a gateway can have a controller programmed to detect a request from a VoIP terminal to communicate with an emergency response center, and transmitting to a network proxy the request with a MAC address of the gateway for enabling communications between the VoIP terminal and the emergency response center.

Figure 1:
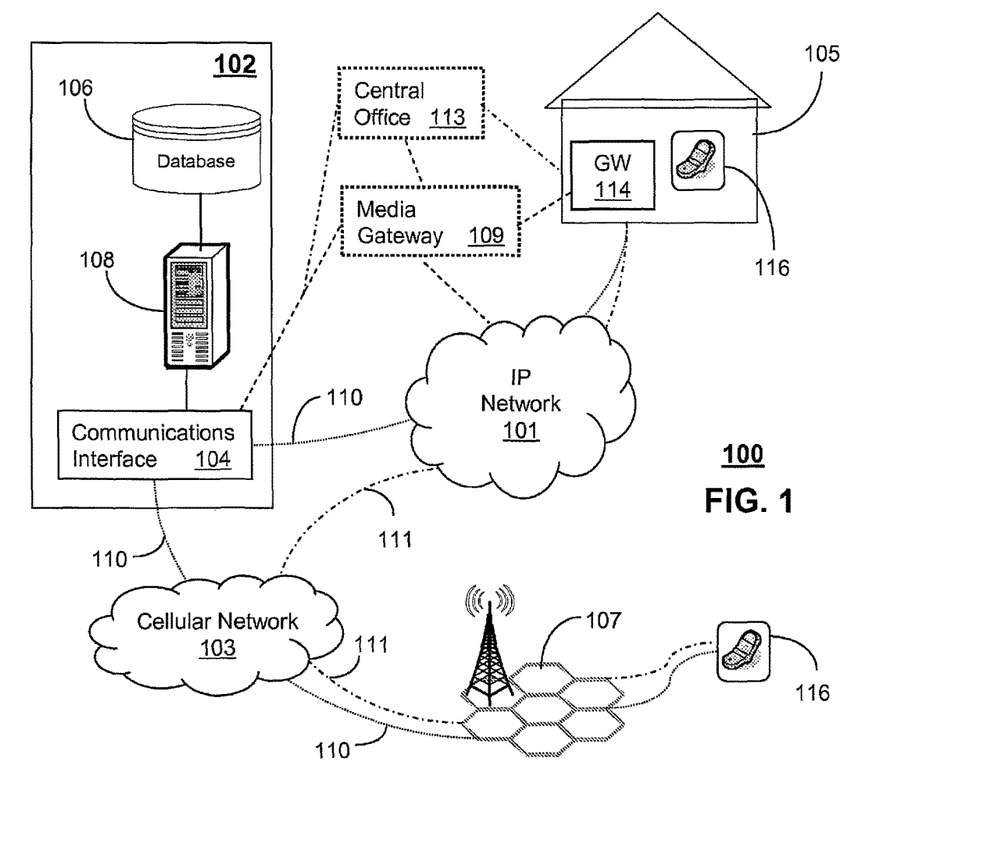
FIG. 1 depicts an exemplary embodiment of multimode VoIP terminals communicating by way of wired and wireless access points (WAPs) with other communication devices and/or a network proxy which collectively operate in a communication system.

FIG. 1 depicts an exemplary embodiment of multimode VoIP terminals 116 communicating by way of wired and wireless access points (WAPs) with other communication devices and/or a network proxy 102 which collectively operate in a communication system 100. The communication system 100 comprises an IP (Internet Protocol) network 101 coupled to the network proxy 102, a cellular network 103 and network elements located in a building 105 representing an enterprise or residence. The IP network 101 utilizes technology for transporting Internet traffic.

In an enterprise setting, the building 105 can include a gateway (GW) 114 that provides voice and/or video connectivity services between VoIP terminals 116 or other forms of communication devices of enterprise personnel. In a residential setting, the building 105 can include a GW 114 represented by, for example, a residential gateway coupled to a central office 113 utilizing conventional telephonic switching for processing calls with third parties.

The network proxy 102 can be used to control operations of a media gateway 109, the central office 113 and the GW 114. Communications between the network proxy 102, VoIP terminals 116 and other network elements of the communication system 100 can conform to any number of signaling protocols such as a session initiation protocol (SIP), or a video communications protocol such as H.323 which combines video and voice over a packet-switched network.

The network proxy 102 can comprise a communications interface 104 that utilizes common technology for communicating over an IP interface with the IP network 101, the media gateway 109, the cellular network 103, and/or the GW 114. By way of the communications interface 104, the network proxy 102 can direct by common means any of the foregoing network elements to establish packet switched data, voice, and/or video connections between VoIP terminals 116 distributed throughout the communication system 100. The network proxy 102 further comprises a memory 106 (such as a high capacity storage medium) embodied in this illustration as a database, and a controller 108 that makes use of computing technology such as a desktop computer, or scalable server for controlling operations of the network proxy 102. The network proxy 102 can operate as an IP Multimedia Subsystem (IMS) conforming in part to protocols defined by standards bodies such as 3GPP (Third Generation Partnership Protocol).

Under the control of the network proxy 102, the media gateway 109 can link packet-switched and circuit-switched technologies such as the cellular network 103 (or central office 113) and the IP network 101, respectively. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for VoIP terminals 116.

The cellular network 103 can support voice and data services over a number of access technologies such as GSM-GPRS, EDGE, CDMA-1X, UMTS, WiMAX, software defined radio (SDR), and other known and future technologies. The cellular network 103 can be coupled to base stations 107 under a frequency-reuse plan for communicating over-the-air with roaming VoIP terminals 116.

Figure 2:
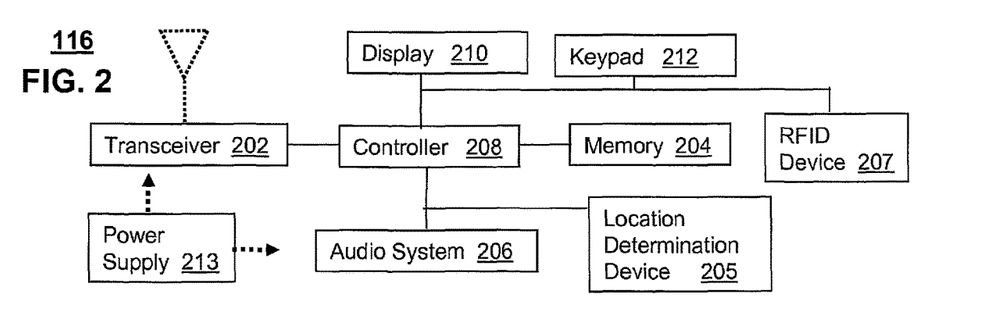
FIG. 2 depicts exemplary embodiments of the multimode VoIP terminal.

FIG. 2 depicts exemplary embodiments of the multimode VoIP terminal 116. In one embodiment, the VoIP terminal 116 can be embodied in an immobile device (e.g., a wireline phone). In another embodiment, the VoIP terminal 116 can include short range communications technology (e.g., a cordless phone, Bluetooth or WiFi) to support mobility within a small area such as the end user's residence or office.

Additionally, the VoIP terminal 116 can utilize a wireless transceiver 202 that supports long-range wireless communications such as supported by the cellular network 103, or for roaming between WiFi and/or WiMAX access networks. In this embodiment, the wireless transceiver 202 of VoIP terminal 116 can utilize technology for exchanging voice and data messages with the base stations 107 (or WiFi and WiMAX access points), which in turn can relay said messages to targeted end user terminals 116.

A multimode VoIP terminal 116 can support a combination of some or all of the aforementioned wireless and wireline access technologies (e.g., POTS, WiFi, WiMAX, Bluetooth™, cordless, and cellular).

Each of the embodiments of the VoIP terminal 116 can further include a memory 204, an audio system 206, a location determination device 205, a radio frequency identification (RFID) device 207, and a controller 208. The memory 204 can comprise storage devices such as RAM, SRAM, DRAM, and/or Flash memories. The memory 204 can be an integral part of the controller 208. The audio system 206 can comprise a low volume speaker for listening to messages near the end user's ear and an associated microphone for exchanging messages with calling parties. The audio system 206 can further utilize a loud speaker for listening to announcements at a distance substantially away from the end user's ear, and as a speakerphone feature.

The location determination device 205 can represent a global positioning system (GPS) receiver for determining a location fix of the VoIP terminal 116. The RFID device 207 can represent a passive or active RFID for short-range communications. The RFID device 207 can be used for retrieving information such as the media access control (MAC) address of the GW 114 and/or its location. In this embodiment the GW 114 would also include a similar RFID device (although not shown in FIG. 1).

The controller 208 can manage the foregoing components with computing technology such as a microprocessor and/or digital signal processor. The VoIP terminals 116 can further include a display 210 for conveying images to the end user, a keypad 212 for manipulating operations of the VoIP terminal 116, and a portable power supply 213. The audio system 206, display 210, and the keypad 212 can singly or in combination represent a user interface (UI) for interfacing with the end user.

Figure 3:
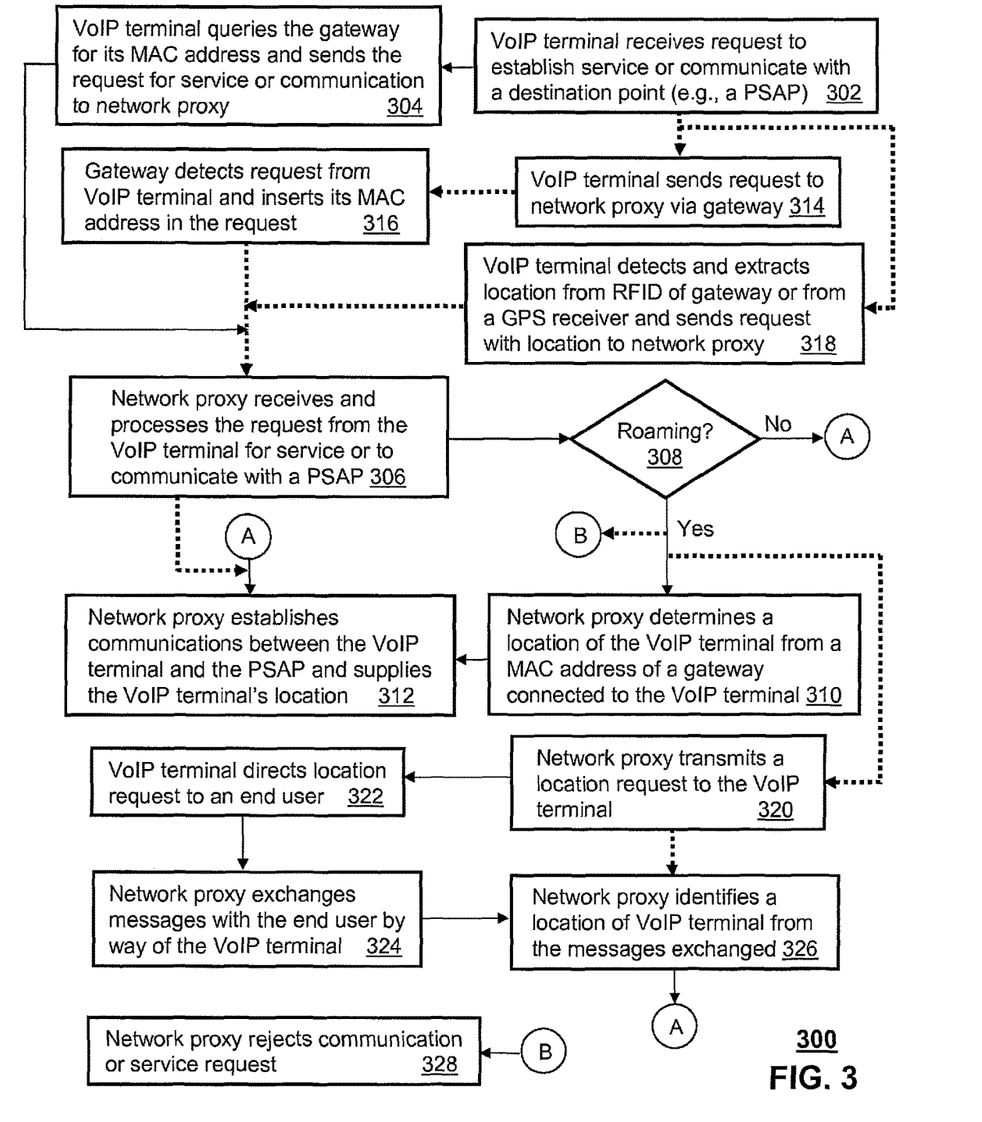
FIG. 3 depicts an exemplary method operating in portions of the communication system.

FIG. 3 depicts an exemplary method 300 operating in portions of the communication system 100. Method 300 has many variants as depicted by the dashed lines. It would be apparent to an artisan with ordinary skill in the art that other embodiments not depicted in FIG. 3 are possible without departing from the scope of the claims described below.

With this in mind, in one embodiment, method 300 begins with step 302 in which a VoIP terminal 116 can be programmed to receive a request from an end user to establish service with the network proxy 102 or communications with a destination point. The request can therefore represent a registration of the VoIP terminal 116 with the network proxy 102, or a mobile or network origination call invoked by the end user by dialing a phone number. The destination point can be another VoIP terminal 116, an emergency response center such as a public service access point (PSAP—911), and/or a POTS or circuit-switched communication terminal. For illustration purposes only, the destination point will be assumed to be a PSAP.

In step 304, the VoIP terminal 116 queries the GW 114 for its MAC address utilizing an address resolution protocol (ARP) or any other common technique for retrieving the GW's MAC address. In the same step, the VoIP terminal 116 forwards the request for service registration, or communications with the destination point to the network proxy 102. In the case of registration, the request can include an ID of the VoIP terminal 116 (such as, for example, its MAC address), and the MAC address of the GW 114. In the case of a communication request, the request can further include an identification (ID) of the PSAP (e.g., 911 or other emergency code). In step 306, the network proxy 102 receives and processes the request for service or to communicate with the PSAP, and in step 308 determines whether the VoIP terminal 116 has roamed outside of its home network (e.g., the end user's residence or office).

The network proxy 102 can determine that the VoIP terminal 116 is roaming by comparing the MAC address of the GW 114 associated with the VoIP terminal's 116 home network and the MAC address received with the request. If the MAC address received does not match with the MAC address of the GW's 114 home network, the network proxy 102 can conclude in step 308 that the VoIP terminal 116 is roaming. Determining whether or not the VoIP terminal 116 is roaming can be managed by way of a common database operating in the network proxy 102. The MAC address of the GW 114 located in the VoIP terminal's 116 home network, and the GW's location can be stored in the database, and can be indexed by way of the MAC address (or other form of ID) of the VoIP terminal.

If the network proxy 102 detects in step 308 that the VoIP terminal 116 is in its home network, the network proxy 102 can establish service and proceed to step 312 whereby it establishes communications between the VoIP terminal and the PSAP and supplies to the PSAP the VoIP terminal's location derived from the GW's home network stored in the network proxy's 102 database. Since gateways are generally immobile devices, the location given can be relied on as the location of the VoIP terminal 116. If instead the network proxy 102 detects in step 308 that the VoIP terminal 116 is roaming by way of detecting a mismatch between the MAC address received and that of its home network, the network proxy 102 can proceed to one among steps 310, 320 and 328.

In step 310, the network proxy 102 can determine the location of the VoIP terminal 116 by way of associating the MAC address of the GW 114 received and a corresponding location stored in the database of the network proxy 102. In this embodiment, the network proxy 102 can be programmed to store the locations of each of the GWs 114 which the VoIP terminal 116 might roam to. This may be possible by tracking the GWs 114 of a service provider and by sharing location information of GWs 114 outside the reach of the service provider through brokering deals, or by FCC mandate to share GW location information across all service providers. Once the GW 114 in question is located, the network proxy 102 can establish service, and proceed to step 312 and enable communications with the PSAP with the location of the VoIP terminal supplied to the PSAP as described earlier.

In another embodiment, the network proxy 102 can be programmed in step 320 to transmit to the VoIP terminal 116 a location request. In step 322, the VoIP terminal 116 can direct the location request to its end user by way of the UI. In step 324, the network proxy 102 can exchange messages with the end user by way of the UI of the VoIP terminal 116. The messages exchanged can be text, voice, Dual Tone Multi-Frequency (DTMF) signals, or combinations thereof processed by, for example, an interactive voice response system (IVR) integrated with the network proxy 102 or managed thereby. From the interactions with the end user (e.g., end user dictates his/her location, or enters location by way of text through the UI), the network proxy 102 in step 326 identifies a location of the VoIP terminal 116 and proceeds to step 312 to enable communications between the VoIP terminal 116 and the PSAP with location information.

In yet another embodiment, the network proxy 102 can be programmed in step 328 to reject the service and communication request received from the VoIP terminal 116 while it is roaming. In this embodiment, the VoIP terminal 116 can only make certain calls such as emergency response center calls from its home network. In a less restrictive embodiment, step 328 can be combined with steps 320-326 to overcome the rejection by way of proactive feedback from the end user of the VoIP terminal 116.

Referring back to step 302, the VoIP terminal 116 can be programmed in another embodiment to submit in step 314 the request to communicate with the PSAP to the network proxy 102 without querying the GW 114 for its MAC address. In step 316 the GW 114 can be programmed to detect the request from the VoIP terminal 116 and proactively insert or append its MAC address to the request. This embodiment replaces the need for the VoIP terminal 116 to query the GW 114 for its MAC address. Steps 306-328 can be applied to this embodiment as previously described.

In yet another embodiment, the VoIP terminal 116 can be programmed in step 302 to proceed to step 318 where it detects and extracts location information from an RFID device located at the GW 114, or from the location determination device 205 of the VoIP terminal 116. Once the location information is retrieved, the VoIP terminal 116 transmits the request and location to the network proxy 102. Since location information is given with the request, the network proxy 102 can be programmed to proceed from step 306 to step 312 thereby enabling communications between the VoIP terminal 116 and the PSAP. It is therefore not necessary to determine in step 308 whether the VoIP terminal 116 is roaming since its location is known.

It would be apparent to an artisan with ordinary skill in the art from the aforementioned exemplary embodiments that there can be numerous other embodiments applied to the present disclosure. Accordingly, said artisan would expect that the present embodiments can be modified, reduced, or enhanced without departing from the scope and spirit of the claims described below. The reader is therefore directed to the claims below for a fuller understanding of the breadth and scope of the present disclosure.

Figure 4:
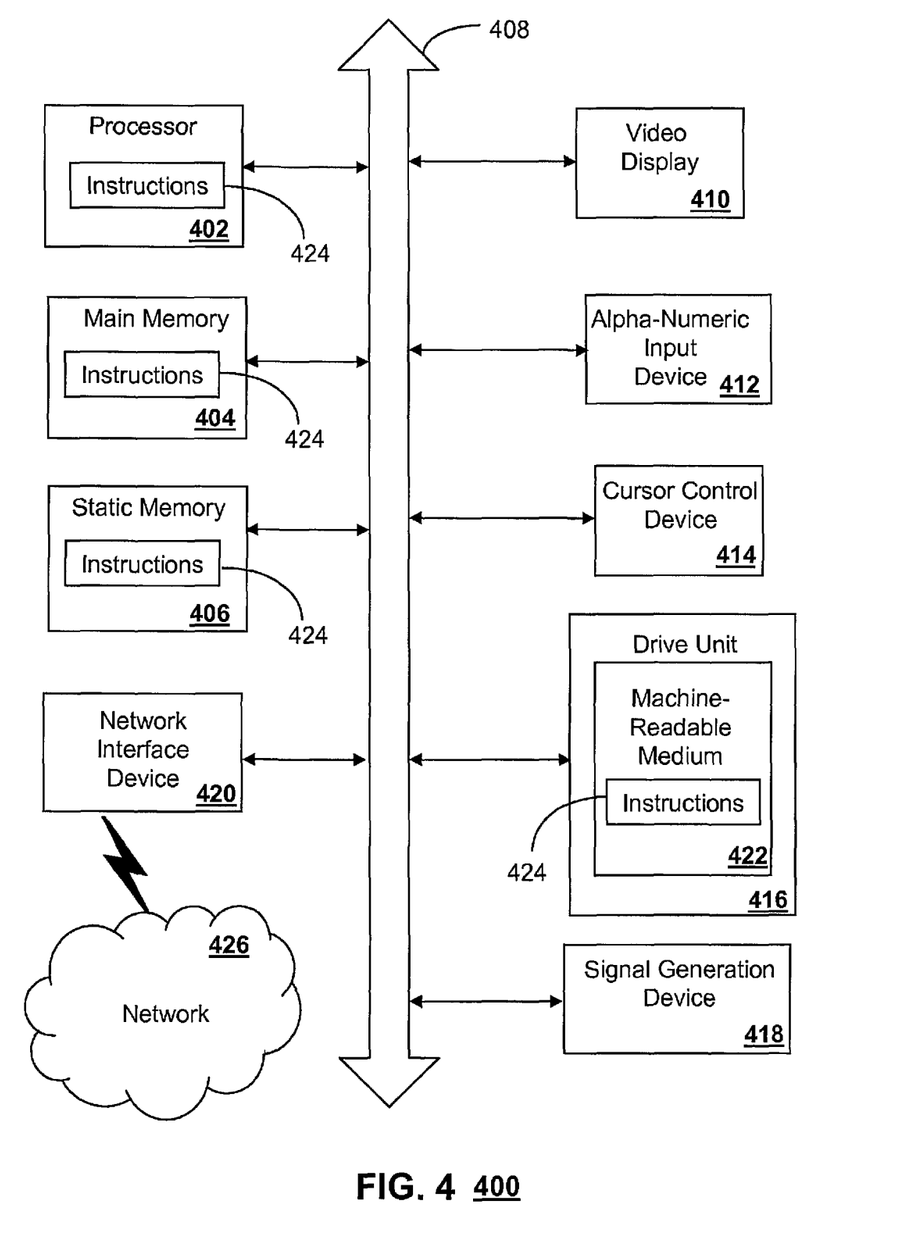
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 47 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   detecting, by a controller of a gateway, a request from a voice over internet protocol terminal to communicate with an emergency response center without the voice over internet protocol terminal querying the gateway for a media access control address for the gateway, wherein the request comprises an identification of the emergency response center and an identification of the voice over internet protocol terminal;
   inserting, by the controller of the gateway, in response to the detecting the request from the voice over internet protocol terminal to communicate with the emergency response center, the media access control address for the gateway into the request to thereby form a modified request; and
   transmitting, by the controller of the gateway, directly to a network proxy, the modified request with the media access control address for the gateway for enabling communications between the voice over internet protocol terminal and the emergency response center, wherein the gateway remains in a fixed location, wherein a location of the voice over internet protocol terminal is capable of being determined using a location of the gateway determined from the media access control address for the gateway, wherein the media access control address for the gateway and the identification of the voice over internet protocol terminal indicate whether the voice over internet protocol terminal is roaming outside of a home network.

2. The method of claim 1, wherein the gateway comprises a residential gateway.

3. The method of claim 1, further comprising:
forwarding, by the controller, to the voice over internet protocol terminal a location request;
receiving, by the controller, a location of the voice over internet protocol terminal; and
establishing, by the controller, communications between the voice over internet protocol terminal and the emergency response center and supplying the emergency response center with the location of the voice over internet protocol terminal.

4. The method of claim 3, wherein the location request is directed to an end user of the voice over internet protocol terminal to bring about an exchange of messages with the end user via the voice over internet protocol terminal to determine the location of the end user.

5. The method of claim 4, wherein the messages correspond to at least one of: voice signals and dual tone multi-frequency signals generated by the end user via the voice over internet protocol terminal.

6. The method of claim 1, wherein the request is transported in a session initiation protocol.

7. A non-transitory computer-readable medium storing a plurality of instructions which, when executed by a controller of a gateway, cause the controller of the gateway to perform operations, the operations comprising:
detecting a request from a voice over Internet protocol terminal to communicate with an emergency response center without the voice over internet protocol terminal querying the gateway for a media access control address for the gateway, wherein the request comprises an identification of the emergency response center and an identification of the voice over internet protocol terminal;
inserting, in response to the detecting the request from the voice over internet protocol terminal to communicate with the emergency response center, the media access control address for the gateway into the request to thereby form a modified; and
transmitting, directly to a network proxy, the modified request with the media access control address for the gateway for enabling communications between the voice over internet protocol terminal and the emergency response center, wherein the gateway remains in a fixed location, wherein a location of the voice over Internet protocol terminal is capable of being determined using a location of the gateway determined from the media access control address for the gateway, wherein the media access control address for the gateway and the identification of the voice over internet protocol terminal indicate whether the voice over Internet protocol terminal is roaming outside of a home network.

8. The non-transitory computer-readable medium of claim 7, wherein the gateway comprises a residential gateway.

9. The non-transitory computer-readable medium of claim 7, further comprising:
forwarding to the voice over Internet protocol terminal a location request;
receiving a location of the voice over internet protocol terminal; and
establishing communications between the voice over internet protocol terminal and the emergency response center and supplying the emergency response center with the location of the voice over internet protocol terminal.

10. The non-transitory computer-readable medium of claim 9, wherein the location request is directed to an end user of the voice over internet protocol terminal to bring about an exchange of messages with the end user via the voice over internet protocol terminal to determine the location of the end user.

11. The non-transitory computer-readable medium of claim 10, wherein the messages correspond to at least one of: voice signals and dual tone multi-frequency signals generated by the end user via the voice over internet protocol terminal.

12. The non-transitory computer-readable medium of claim 7, wherein the request is transported in a session initiation protocol.

13. A gateway comprising:
a controller programmed to:
detect a request from a voice over internet protocol terminal to communicate with an emergency response center without the voice over internet protocol terminal querying the gateway for a media access control address for the gateway, wherein the request comprises an identification of the emergency response center and an identification of the voice over internet protocol terminal;
inserting, in response to the detecting the request from the voice over internet protocol terminal to communicate with the emergency response center, the media access control address for the gateway into the request to thereby form a modified request; and
transmit directly to a network proxy, the modified request with the media access control address for the gateway for enabling communications between the voice over Internet protocol terminal and the emergency response center, wherein the gateway remains in a fixed location, wherein a location of the voice over internet protocol terminal is capable of being determined using a location of the gateway determined from the media access control address for the gateway, wherein the media access control address for the gateway and the identification of the voice over internet protocol terminal indicate whether the voice over internet protocol terminal is roaming outside of a home network.

14. The gateway of claim 13, wherein the gateway comprises a residential gateway.

15. The gateway of claim 13, the controller further programmed to:
forward to the voice over Internet protocol terminal a location request;
receive a location of the voice over Internet protocol terminal; and
establish communications between the voice over internet protocol terminal and the emergency response center and supply the emergency response center with the location of the voice over internet protocol terminal.

16. The gateway of claim 15, wherein the location request is directed to an end user of the voice over Internet protocol terminal to bring about an exchange of messages with the end user via the voice over Internet protocol terminal to determine the location of the end user.

17. The gateway of claim 16, wherein the messages correspond to at least one of: voice signals and dual tone multi-frequency signals generated by the end user via the voice over internet protocol terminal.

18. The gateway of claim 13, wherein the request is transported in a session initiation protocol.

* * * * *